United States Patent [19]
Neal

[11] 3,912,056
[45] Oct. 14, 1975

[54] MEANS FOR INTERLOCKING ACCELERATOR AND PARKING BRAKE CONTROLS

[75] Inventor: Louis R. Neal, Zion, Ill.

[73] Assignee: International Harvester Company, Chicago, Ill.

[22] Filed: Jan. 28, 1974

[21] Appl. No.: 437,261

[52] U.S. Cl. ............... 192/3 T; 192/3 M; 74/483 R
[51] Int. Cl.² .......................................... B60K 29/00
[58] Field of Search .................... 192/3 R, 3 T, 3 M

[56] References Cited
UNITED STATES PATENTS

| | | |
|---|---|---|
| 690,146 | 12/1901 | Harmon ............................. 192/3 M |
| 1,633,360 | 6/1927 | Bragg et al. ......................... 192/3 M |
| 1,897,358 | 2/1933 | Bellis ............................... 192/3 M X |
| 1,992,644 | 2/1935 | Watson .............................. 192/3 M |
| 2,229,056 | 1/1941 | Dick ................................... 192/3 T |
| 2,423,006 | 6/1947 | Chambers ........................... 192/3 T |
| 2,532,544 | 12/1950 | Etnyre ............................... 192/3 T |
| 2,642,166 | 6/1953 | Strauss .............................. 192/3 M |
| 3,750,780 | 8/1973 | Danek ............................... 192/3 M |

Primary Examiner—Benjamin W. Wyche
Attorney, Agent, or Firm—William H. Wendell; Floyd B. Harman

[57] ABSTRACT

A parking brake and accelerator system in which the activation of the parking brake engages a lockout mechanism which restricts the operator's ability to increase the output of the power source.

1 Claim, 4 Drawing Figures

MEANS FOR INTERLOCKING ACCELERATOR AND PARKING BRAKE CONTROLS

BACKGROUND OF THE INVENTION

This invention relates to parking brake and accelerator interlocking systems for operator controlled vehicles and more particularly concerns an arrangement where the parking brake activation engages a rigid member mechanism which directly restricts the output power of the power source that the operator can demand.

During the operation of operator controlled vehicles there are instances where it is necessary to secure them against inadvertent motion by applying a parking brake that resists such motion. The need for an accelerator lockout arises from the fact that the power source, either alone or in combination with other forces, has the capability to overcome the brake's resistance to motion. The accelerator lockout protects against the unintentional application of this power by the operator.

There are two existing systems in the prior art which restrict the operator's ability to increase the power output when the parking brake is applied. Both systems are functional when the operator controlled braking means is either an adjustable or a non-adjustable mechanism. One of the systems utilizes a flexible connection, Bowden cable type, to activate an accelerator pedal jamming mechanism when the parking brake is applied. This system suffers from several problem areas, such as the flexible member's susceptibility to loss of effectiveness from kinking or corrosion caused by the elements, and the difficulty and relative expense of mounting and using this type of connecting member. The second system eliminates the problems of the flexible connector system by using a mechanism that consists of rigid members, but in this system the primary mechanism acts on a lever that is a slave with regard to the accelerator pedal. This slave condition, where the jammed member moves in a linkage arrangement that parallels the actual accelerator linkage arrangement, produces the problems of a possibility of a tolerance buildup or a failure of the slave system which will decrease the effectiveness of the interlocking system. Accordingly, it is the primary aim of the present invention to overcome the problems of the prior systems while providing a functional and practical means for locking out the accelerating system when the parking brake is applied.

With more particularity, it is an object of the present invention to provide a parking brake and accelerator interlock system which is relatively inexpensive and relatively resistant to the abrasive character of its environment while disrupting the operator's commands in their primary circuit.

Finally another object of the present invention is to provide a system of the class described which is easy to install, easy to maintain and dependable in its operation.

SUMMARY OF THE INVENTION

In accordance with the invention the system will function on an operator controlled vehicle which has a power source, a means for controlling the output of this source, and a braking means for resisting the motion of the vehicle, and comprises a combination of an engaging and locking means which allows the operator to engage and lock the braking means, an actuator means which carries the operator's commands from the engaging and locking means to the braking means, a rigid member lockout means which reacts to the braking command of the operator and jams the transmitting means that carries the operator's power output commands from an operator's accelerator control means to the power source control means.

DESCRIPTION OF THE PREFERRED EMBODIMENT

When an operator controlled vehicle is in motion, it is desirable that the operator be able to vary the output of the power source P to meet the requirements of the functions being performed. During this type of vehicle operation the interlock system of the present invention is in the "off" position depicted in FIG. 1. In this position the brakes B is not engaged since the actuator 24 has communicated the operator's choice of not activating conventional engaging and locking linkage A. The operator controlled means is also free to rotate through the full power range PR of the power source. The operator's choice of power in this range is communicated to the power source control device M by the transmitter T since the unengaged position of the brake arrangement puts the rigid member lockout arrangement L in its "off" position.

Figure 1:
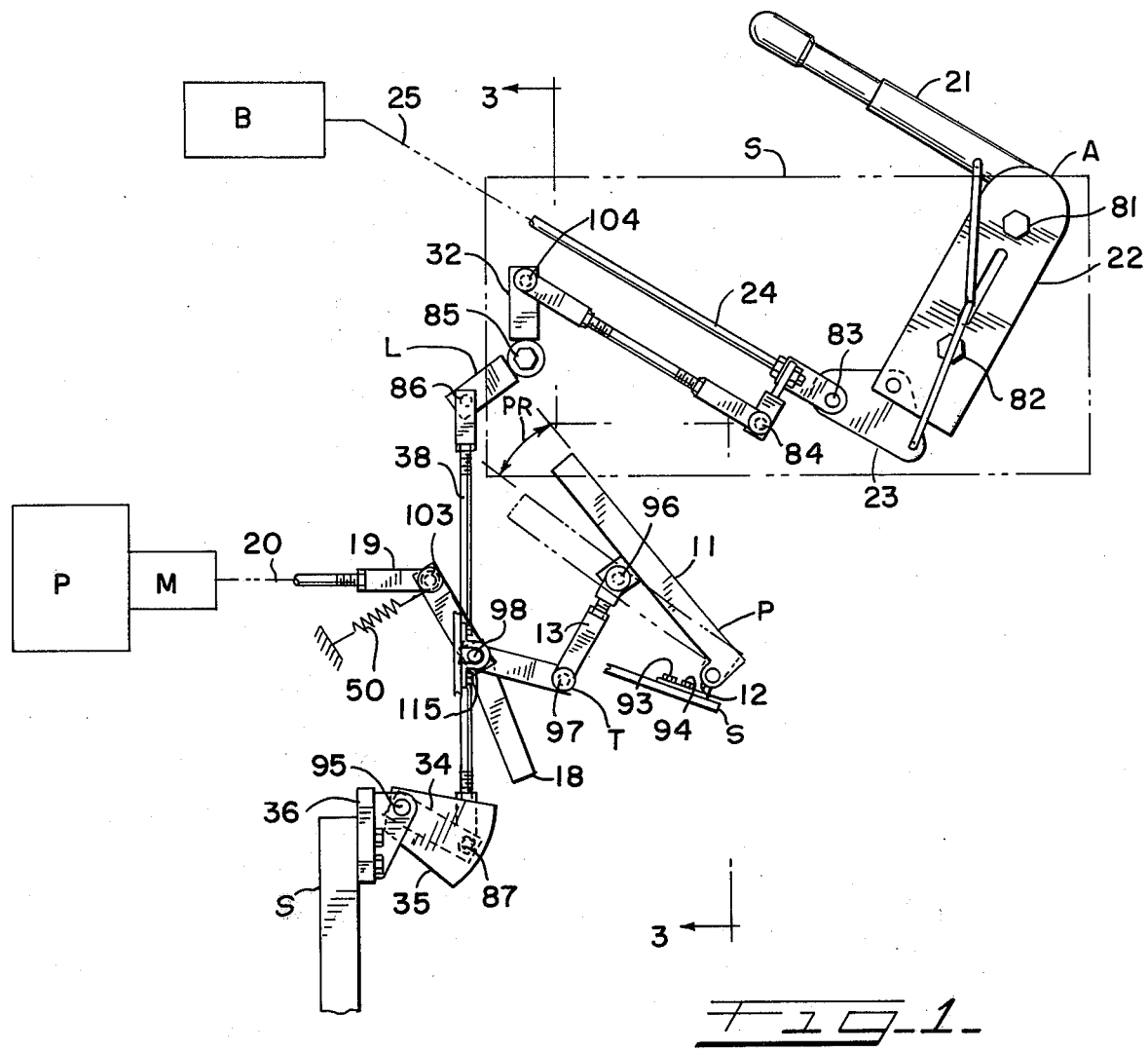
FIG. 1 is a partially schematic side view of a parking brake and accelerator interlocking system in accordance with the present invention, the lockout being shown in its "off" or normal running position wherein the brakes and accelerator are in their normal free operating position.
Figure 2:
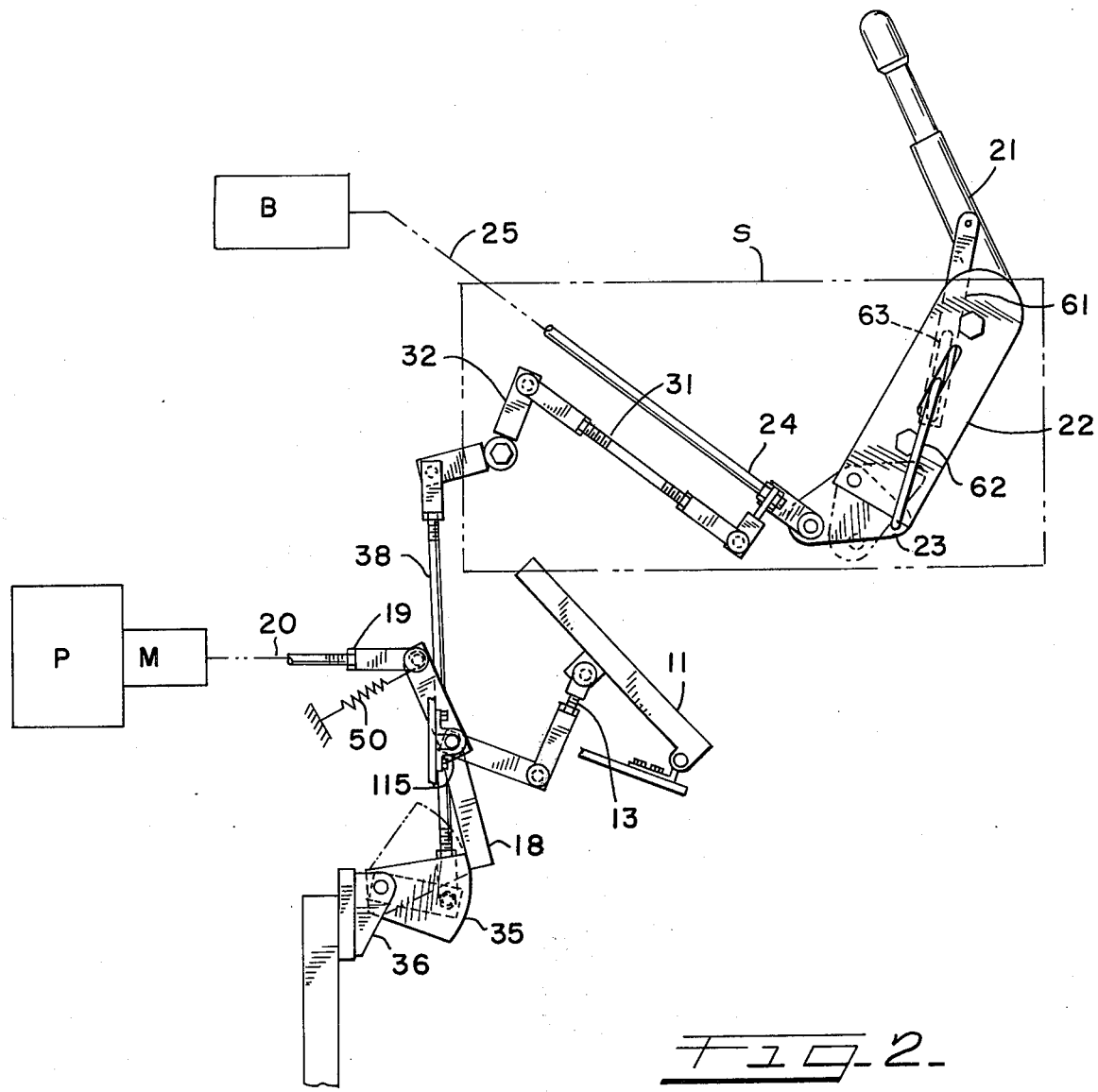
FIG. 2 is a view similar to FIG. 1, but showing the system in its "on" position wherein the brakes are locked in their engaged position and the accelerator is locked out.

In the preferred construction the engaging and locking linkage is rigidly mounted on the frame S of the vehicle at points 81 and 82. In the particular device illustrated the engaging and locking linkage consists of an operator controlled lever 21 pivotally connected to a control mechanism 22 which is adjustably and pivotally connected to a control lever 23. The control mechanism can be either non-adjustable, as shown in FIG. 1, or adjustable, as shown in FIG. 2. The actuator 24 of the illustrated construction is pivotally connected to the control lever at point 83 and operably connected, shown as a phantom line 25, to the brake.

Figure 4:
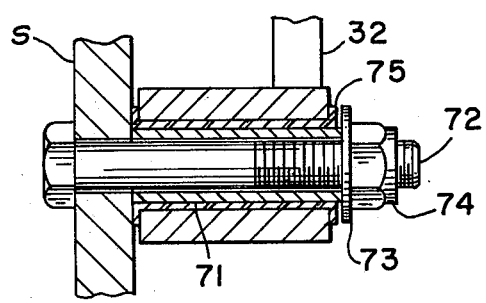
FIG. 4 is a section view showing the mounting of the intermediate bell crank of the lockout arrangement of the preferred embodiment.

During the vehicle operations when the power source output must be varied, FIG. 1, the rigid member lockout arrangement is orientated in its "off" position by its pivotal connection at point 84 to the actuator. In its illustrated form the rigid member lockout arrangement consists of an intermediate adjustable member 31 which is pivotally connected to the actuator at point 84 and is pivotally connected to the intermediate bell crank 32 at point 104. The intermediate bell crank is pivotally mounted to the vehicle frame as at point 85. The preferred construction for the mounting of the intermediate bell crank to the frame is illustrated in FIG. 4. This view shows the intermediate bell crank rotatably mounted on an annular spacer 71 which is attached to the frame by a bolt 72, an annular spacer 73 and a nut 74. The rotational friction is decreased in the present instance by an annular flanged bushing 75.

The intermediate bell crank establishes the position of the lockout bell crank 34 by pivotal connections between the bell cranks and the adjustable lockout member 38 at points 86 and 87 respectively. The lockout bell crank is pivotally mounted at point 95 to a bell crank support 36 which is rigidly attached to the frame as at points 88, 89, 90, and 91, shown in FIG. 3. In the "off" position the lockout bell crank does not prevent the operator from varying the output of the power source since the lockout arm 35 does not restrict the travel of the accelerator means.

Figure 3:
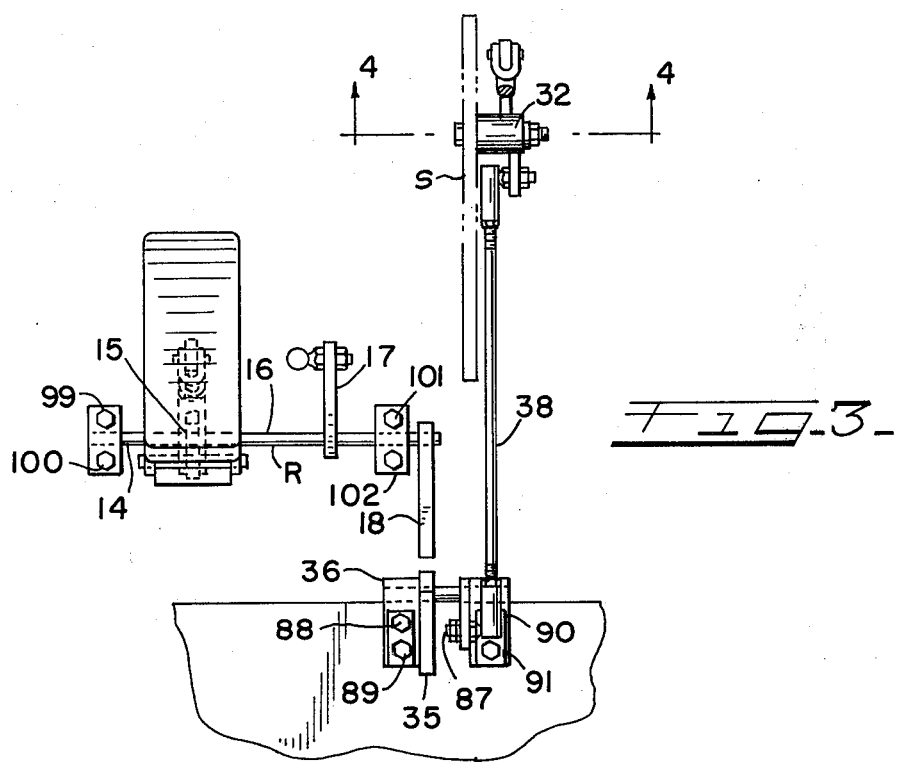
FIG. 3 is an elevation view of the interlock arrangement shown in the "off" position of FIG. 1.

In the illustrated form the accelerator mechanism includes an operator control member and a transmitter. The operator control member consists of an accelerator pedal 11 pivotally connected at point 92 to a mounting bracket 12 which is rigidly attached to the vehicle frame as at points 93 and 94. When the accelerator pedal position is varied by the operator, the motion is communicated to the transmitter through a pivotal connection at point 96. The transmitter includes an adjustable pedal connector 13 that attaches to the accelerator pedal at point 96 and pivotally connects to the rockshaft 14, at point 97, on the first arm 15. The rockshaft R, shown in FIG. 3, is pivotally supported by the rockshaft mounting brackets 115 to define pivot axis 98, with the mounting brackets rigidly attached to the frame by suitable fastening means, such as bolts 99, 100, 101 and 102.

The rockshaft transmits the motion of the accelerator pedal from the first arm, which is rigidly connected to the rod 16, through the rod to the second arm 17, which is also rigidly connected to the rod and is pivotally connected to the adjustable connector 19 at point 103. The adjustable connector is connected, shown as a phantom line 20, to the the power source control device M. The adjustable connector is also acted upon by a resilient means 50 which biases the transmitter to the lowest power source position. The resilient means is rigidly attached to the frame S and is pivotally attached to the adjustable connector.

The motion transmission of the rockshaft can be retarded by the lockout bell crank's interference with a third arm 18, which is rigidly connected to the rigid connector. This interference is illustrated in FIG. 2 and is the result of the operator moving the operator control lever to the engaged position shown. This action by the operator rotates the control lever 23 which causes the actuator 24 to move to the position shown. The movement of the actuator engages the brake means and rotates the intermediate bell crank 32 to the "on" position. The rotation of the intermediate bell crank rotates the lockout bell crank to the shown "on" position which causes arm 35 of the lockout bell crank to limit the range of rotation of the third arm of the rockshaft to the lower power output range of the power source. This limitation directly interfers with the operator's ability to accidentally increase the power output of the power source which would override the parking brake and put the vehicle into undesired motion.

In keeping with the invention the lockout bell crank can be formed to make it possible to use the interlock system when the engaging and locking linkage is adjustable. As shown in FIG. 2, when there must be adjustments to allow for wear in the brake sliding, adjustments could be made in the control mechanism members 61 and 62 that will rotate the control lever 11 to the position shown as dotted lines. With the control lever in the dotted line adjusted position the lockout means L will rotate through a different arc than that shown in solid line geometry. However, by forming the lock arm 35 of the lockout and bell crank in an annular cam shape, the arc traveled in the adjusted position will not affect the function of the interlock system, the adjusted position of the lockout arm, shown as dotted lines, will still limit the rotation of the transmitter to the lower power output range of the power source.

Thus it is apparent that there has been provided, in accordance with the invention, a parking brake and accelerator interlock system that is resistant to the abrasive environment because it consists of rigid members, is relatively inexpensive since simple members can be combined to perform the function, is relatively easy to install since there is no highly sophisticated equipment required by the simple components and is dependable because its direct lockout eliminates secondary causes of failures and tolerance buildups.

The invention has been described in conjunction with specific embodiments thereof, it is evident that many alternatives, modifications, and variations will be apparent to those skilled in the art in the light of the foregoing description. Accordingly, it is intended to embrace all such alternatives, modifications, and variations as fall within the spirit and broad scope of the appended claims.

What is claimed is:

1. A parking brake and accelerator interlock system for an operator controlled vehicle having brakes, an adjustable engaging and locking linkage whereby said operator can engage and lock said brake, a power source and a power source control device, said system comprising:
   an actuator connecting said adjustable engaging and locking linkage and said brakes;
   an accelerator mechanism whereby said operator controls said power source control device, said mechanism comprising;
   a pedal control whereby said operator uses his foot to establish the power output level;
   a mounting bracket support pivotally supporting said pedal control;
   a rockshaft;
   an adjustable connector joining said rockshaft and said power source control device;
   an adjustable pedal connector fastening said pedal control to said rockshaft;
   a rigid member lockout assembly operable in response to actuation of said brakes to positively disrupt the operation of said rockshaft, said assembly comprising;
   a lockout bellcrank pivotally mounted in close proximity to said rockshaft and pivotal by said operator from a free acceleration position to a lockout position, said lockout position positively disrupting the operation of said rockshaft;
   an intermediate bellcrank pivotally mounted to transmit said operator's lockout command from said engaging and locking linkage to said lockout bellcrank;
   an intermediate adjustor connecting said intermediate bellcrank and said actuator; and
   an adjustable lockout pivotally connected to said intermediate bellcrank and said lockout bellcrank.

\* \* \* \* \*